UNITED STATES PATENT OFFICE.

ZDENKO H. SKRAUP, OF VIENNA, AUSTRIA, ASSIGNOR TO BADISCHE ANILIN AND SODA FABRIK, OF BADEN, GERMANY.

PRODUCTION OF OXYCHINOLINE.

SPECIFICATION forming part of Letters Patent No. 237,917, dated February 15, 1881.

Application filed January 6, 1881. (Specimens.)

*To all whom it may concern:*

Be it known that I, ZDENKO HANNS SKRAUP, a subject of the Emperor of Austria, residing at Vienna, in the Empire of Austria, have invented new and useful Improvements in Oxychinoline, produced from ortho-nitro-phenol and ortho-amido-phenol, of which the following is a specification.

This invention relates to the production of oxychinoline, a substance intended for the manufacture of blue dyestuffs, and for other purposes.

My invention consists in the discovery that oxychinoline may be obtained from carbolic acid (phenol) by heating mixtures of nitro and amido phenols with glycerine and sulphuric acid.

As an example of the manner in which my invention may be carried into effect, I proceed as follows: Fourteen parts, by weight, of ortho-nitro-phenol are intimately mixed with twenty-one parts, by weight, of ortho-amido-phenol, and with sixty parts, by weight, of glycerine of about 1.26 specific gravity. I then add fifty parts, by weight, of concentrated sulphuric acid of about 1.848 specific gravity, and the mixture thus obtained is heated in a suitable still or vessel provided with a condensing arrangement which allows the condensed vapors to flow back into the still. After about two hours heating at a temperature not exceeding about 150° centigrade, little if any nitro-phenol will be found unchanged in the mixture, and the operation may then be considered at an end.

In order to separate the oxychinoline thus formed various methods may be employed. For instance, a current of steam may first be passed through the mixture until any remaining traces of ortho-nitro-phenol have become volatilized. The residual solution is then mixed with a slight excess of a fixed caustic or carbonated alkali, and the oxychinoline thus set free may be extracted by means of a suitable solvent, such as, for instance, sulphuric ether, when, after the evaporation of the said solvent, the oxychinoline will be obtained in its solid condition; the separation may likewise be effected by submitting the aforesaid alkaline mixture to a distillation with steam.

Some characteristic properties of the oxychinoline prepared as above described are as follows: It is a whitish crystalline solid, difficultly soluble in water but easily soluble in alcohol and benzole. It dissolves in both acids and alkalies. At an ordinary temperature it is perceptibly volatile, and in an atmosphere of steam it can be completely volatilized. Ferric chloride colors its solutions intensely dark green.

What I claim as new, and desire to secure by Letters Patent, is—

1. As a new article of manufacture, oxychinoline produced by the action of glycerine and sulphuric acid upon a mixture of ortho-nitro-phenol and ortho-amido-phenol, substantially as described, or by any other means which will produce a like result.

2. The within-described process of producing oxychinoline by the action of glycerine and sulphuric acid upon a mixture of ortho-nitro-phenol and ortho-amido-phenol, substantially as described.

In testimony whereof I have hereunto set my hand in the presence of two subscribing witnesses.

ZDENKO HANNS SKRAUP.

Witnesses:
 Dr. RICHARD HASENÖHRL,
 GUSTAV HIEDEREST.